US006926285B1

(12) United States Patent
Suggs et al.

(10) Patent No.: US 6,926,285 B1
(45) Date of Patent: Aug. 9, 2005

(54) JACKETED SPIRAL WOUND GASKET

(75) Inventors: Steven Suggs, Nacogdoches, TX (US); Kris Kolb, Nacogdoches, TX (US); Ken Fulmer, Tyler, TX (US)

(73) Assignee: Acadia Elastomers Corporation, Nacogdoches, TX (US)

( * ) Notice: Subject to any disclaimer, the term of this patent is extended or adjusted under 35 U.S.C. 154(b) by 404 days.

(21) Appl. No.: 10/015,444

(22) Filed: Dec. 11, 2001

(51) Int. Cl.⁷ ............................................. F16L 17/06
(52) U.S. Cl. ..................................... 277/610; 277/633
(58) Field of Search ................................ 277/610, 633

(56) References Cited

U.S. PATENT DOCUMENTS

| | | | | |
|---|---|---|---|---|
| 2,639,198 A | * | 5/1953 | Kirkham ...................... 384/16 |
| 3,168,319 A | * | 2/1965 | Paulsen ....................... 277/433 |
| 3,180,650 A | * | 4/1965 | Liebig ......................... 277/572 |
| 3,404,061 A | | 10/1968 | Shane |
| 3,576,328 A | * | 4/1971 | Vose ........................... 277/558 |
| 3,580,590 A | * | 5/1971 | Zotter ......................... 277/280 |
| 3,762,729 A | * | 10/1973 | Hopp .......................... 277/536 |
| 3,822,870 A | * | 7/1974 | Campleboux et al. ....... 267/152 |
| 3,854,737 A | * | 12/1974 | Gilliam, Sr. ................. 277/566 |
| 3,858,312 A | | 1/1975 | Gharaibeth |
| RE29,702 E | | 7/1978 | Owen et al. |
| 4,127,277 A | | 11/1978 | Owen et al. |
| 4,189,819 A | | 2/1980 | Nicholson |
| 4,203,191 A | | 5/1980 | Gibson, Sr. |
| 4,239,245 A | | 12/1980 | Giglio et al. |
| 4,379,112 A | * | 4/1983 | Heikes et al. ............... 267/159 |
| 5,275,423 A | * | 1/1994 | Allen et al. ................. 277/610 |
| 5,395,469 A | * | 3/1995 | Suggs et al. ................ 156/173 |
| 5,421,594 A | * | 6/1995 | Becerra ....................... 277/608 |
| 5,527,047 A | * | 6/1996 | Waterland, III ............. 277/610 |
| 5,785,322 A | | 7/1998 | Suggs et al. |
| 5,913,522 A | * | 6/1999 | Koch ........................... 277/610 |
| 5,964,468 A | * | 10/1999 | Chester et al. .............. 277/610 |
| 6,195,867 B1 | | 3/2001 | Hashiguchi |
| 6,250,646 B1 | * | 6/2001 | Chang ......................... 277/603 |
| 6,590,852 B1 | * | 7/2003 | McCormick, Jr. ........ 369/112.23 |
| 6,665,925 B1 | * | 12/2003 | Suggs et al. ............... 29/564.8 |
| 2003/0070279 A1 | * | 4/2003 | Harding ....................... 29/527.2 |
| 2003/0193147 A1 | * | 10/2003 | Hashiguchi et al. ........ 277/633 |

FOREIGN PATENT DOCUMENTS

EP 0992719 A1 * 4/2000

OTHER PUBLICATIONS

Leader Gasket, Technical Data Sheets, Revision 1.2, Apr. 1996, Sections 1-10.
The Global Leader in Metallic Gaskets brochure, JM Clipper Corporation, 403 Industrial Drive, Nacogdoches, TX 75961 (undated).
Johns-Manville Packings and Gaskets brochure, pp. H8-H13 (undated).

(Continued)

*Primary Examiner*—William L. Miller
(74) *Attorney, Agent, or Firm*—Baker, Donelson, Bearman, Caldwell & Berkowitz, PC

(57) ABSTRACT

A spiral wound gasket made of an elongate band jacketed by a sealing material, with the elongate band wrapped in overlapping turns to define a radially thick gasket with an inner diameter for being exposed to a material to be sealed and an outer diameter, in which the jacket of the sealing material defines interior portions of the gasket having the sealing material with a first density between adjacent overlapping turns of the elongate band and defining opposing flange sealing faces of the sealing material with a second density lower than said first density, for use in sealing applications.

9 Claims, 4 Drawing Sheets

OTHER PUBLICATIONS

Decision Data, Johns-Manville, Spirotallic Gaskets, pp. GM-911-1-GM-911-21, Jun. 19, 1962.

Klozure® Oil Seats Master Catalog, pp. 1, 6, 7; Garlock Inc., 1666 Division Street, Palmyra, NY 14522, May 1995.

Master Oil Seal Catalog, pp. 1-3, 5-7, 9, 11, 13-18, 25-28, 127; JM Clipper Corporation, 403 Industrial Drive, Nacogdoches, TX 75961, Jul. 1995.

* cited by examiner

JACKETED SPIRAL WOUND GASKET

TECHNICAL FIELD

The present application relates to gasket manufacturing apparatus and processes. More particularly, the present invention is directed to apparatus and methods for manufacturing spiral wound gaskets.

BACKGROUND OF THE INVENTION

Spiral wound gaskets are used for sealing connections typically in high pressure, high temperature industrial processing applications. Spiral wound gaskets are formed by winding a continuous length of a thin narrow metal band in overlapping relation around a die so that the metal band spirals around. The overlapping layers of the band define the narrow radially-thick gasket having an inner diameter and an outer diameter for being received in a sealing application. The gaskets typically included a sealing material that wrapped the metal band. Previously, the sealing material was formed with strips of asbestos. The asbestos provided high temperature sealing capabilities for the spiral wound gasket. Asbestos however fell from favor and the industry began using graphite sheet material.

Graphite has long been recognized as a material which exhibits superior performance characteristics for sealing applications requiring gaskets and packing. These characteristics include high thermal stability, low thermal conductivity, natural lubricity, resistance to chemical degradation, conformability, and resilience.

Graphite has typically been provided in the form of calendared sheets made with expanded intercalated flake graphite worms. Intercalated flake graphite is made by treating natural or synthetic graphite flakes with an intercalating agent such as fuming nitric acid, fuming sulfuric acid, or mixtures of concentrated nitric acid and sulfuric acid. The intercalated flake graphite is then expanded at high temperatures to form a low-density, worm-like form of particulate graphite having typically an 80–100 fold increase in size over the flake raw material. U.S. Pat. No. 3,404,061 describes the production of intercalated flake graphite as an intermediate step in the production of expanded intercalated graphite. Expanded intercalated graphite worms have thin structural wall and are light-weight, puffy, airy, and elongated bodies.

These characteristics of expanded intercalated graphite worms lead to exceedingly difficult volumetric, handling, and use problems. A significantly large volume of the worms is required to produce a relatively thin layer of gasket material. There is an approximate 100 to 1 ratio between the volume of expanded worms and compressed worms. The worms being extremely lightweight, are difficult to handle. The slightest air current quickly stirs up the worms.

Because of these characteristics, expanded intercalated graphite worms are calendared to produce sheets of graphite. Calendared graphite is commercially available as GRAFOIL brand sheets. The calendared sheets known as "paper" have uniform density and uniform thickness. The calendared sheets are generally available in several standard thickness and densities.

The sheet may be die-cut to form a gasket or cut into strips. To provide increased tensile strength, a layer of mylar adhesive is applied to one surface of the sheet. The mylar allows the cut sheet to be applied to a substrate, such as an annular metal disk. Strips of the calendared sheet are also applied to the metal band and wrapped in the above-described spiral to form a graphite-based spiral wound gasket.

Gaskets manufactured with calendared graphite sheet typically are used for sealing purposes in high pressure, high temperature fluid flow applications. While the use of graphite gaskets perform sealing functions and have advantages over the use of asbestos-based gaskets, there were disadvantages as well. Cut calendared graphite sheet particularly provides open edges which is susceptible to possible high pressure attack from the fluids being sealed by the gasket.

The graphite based spiral wound gasket had higher minimum seat. The term "minimum seat" refers to the loading required in order to set the gasket for sealing. The higher minimum seat therefore required an increased load over that required for asbestos based spiral wound gaskets. Higher loads led to a bolt load retention problem. As the connection sealed with the spiral wound gasket experienced changes in temperature and pressure, the connection would flex. The loading would change and loosen in response to these fluctuations. Periodically, the loads imposed by the fasteners on the connection needed to be checked and reset. Two problems arose from the use of connections improperly loaded for spiral wound graphite gaskets. These problems were bent flanges and a condition known as interbuckling. The term "interbuckling" refers to a side wall of the gasket collapsing into the interior of the connection.

In response to these problems, graphite-jacketed wire mesh core packing was developed. This type of packing provided a low minimum seat with a metal mesh core for rigidity and strength. One drawback however to the use of such sealing material was the large range of flanges, sizes and pressures necessary for proper service. While the graphite jacketed metal core gasket material was directed towards application for spiral wound gaskets, this type of sealing material generally replaced flexible paper gaskets.

In order to resolve the interbuckling problem, gasket manufacturers added an inner guide ring. The inner guide ring supported the lateral side wall of the spiral wound gasket and restricted interbuckling of the wall. This solution however increases the cost of the gasket significantly. The use of inner guide rings to prevent interbuckling is generally limited to service applications requiring an exotic metal due to the corrosive nature of the material being sealed.

In addition, the recognized temperature range available for graphite-formed spiral wound gaskets has been decreased as experience developed using such gaskets. When initially developed, it was believed that graphite-formed spiral wound gaskets would be suitable for use up to 5000° F. Through experience, it is now believed that the suitable temperature range for graphite-formed spiral wound gaskets is limited to about 650° F. To increase the temperature range, the graphite-formed spiral wound gaskets were treated in a acid bath, such as phosphoric acid. Such treated gaskets are believed suitable for use up to about 850° F.

Accordingly, there is a need in the art for an improved spiral wound gasket and method of manufacture which overcomes the temperature, loading, and performance limitations of the present spiral wound gaskets. It to such that the present invention is directed.

BRIEF DESCRIPTION OF THE PRESENT INVENTION

The present invention meets the need in the art by providing a spiral wound gasket comprising an elongate band jacketed by a sealing material. The elongate band wraps in a plurality of overlapping turns to define a radially thick gasket having an inner diameter for being exposed to a material to be sealed and an outer diameter. The jacket of the sealing material defines interior portions of the gasket having the sealing material with a first density between adjacent overlapping turns of the elongate band and defining opposing flange sealing faces of the sealing material with a second density lower than said first density, for use in sealing applications.

Objects, features, and advantages of the present invention will become apparent from a reading of the following detailed description of the invention and claims in view of the appended drawings.

DETAILED DESCRIPTION OF THE PREFERRED EMBODIMENTS

Figure 1:
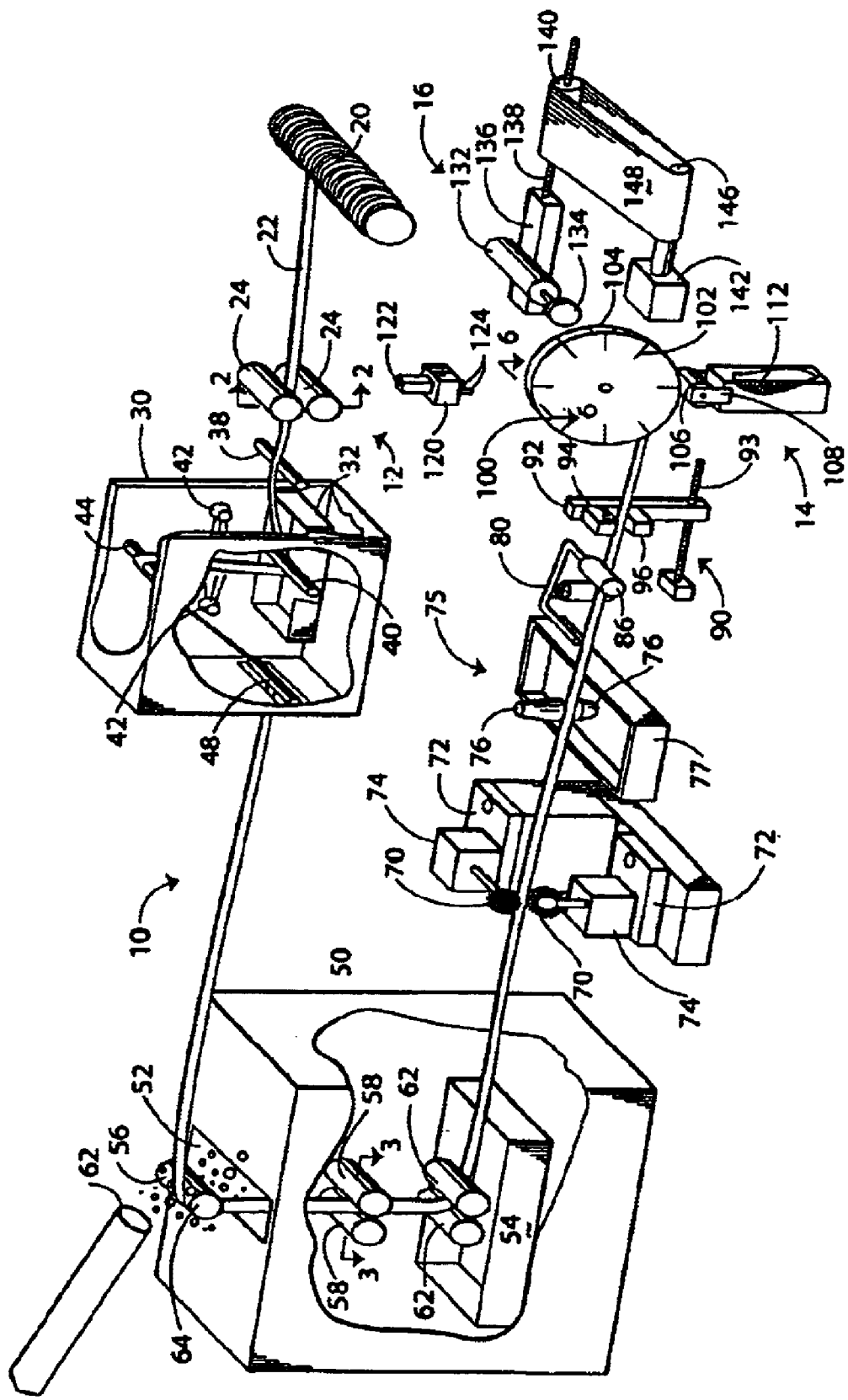
FIG. 1 illustrates in perspective schematic view an apparatus according to the present invention for manufacturing spiral wound gaskets.

Referring now in more detail to the drawings, in which like numerals indicate like parts throughout the several views, FIG. 1 is a perspective schematic view of an apparatus 10 for manufacturing spiral wound gaskets according to the present invention. The apparatus 10 includes a band supply section 12, a gasket forming section generally 14, and a gasket discharge section 16.

The band supply section 12 includes a supply 20 of an elongate band 22. In a preferred embodiment, the elongate band 22 is a narrow metal band. A pair of opposing crimp rollers 24 have opposing mating surfaces for defining a crimp or impression in the band 22. The band 22 passes between the opposing crimp rollers 24.

Adjacent the crimp rollers 24 is a tower 30 that houses a chemical bath 32 and an adhesive applicator generally 34. The bath 32 includes a basin which is periodically provided with a solution for cleaning the metal band 22. Spaced-apart rollers 38, 40 guide the metal band over an edge of the basin and into the solution contained within the basin. The tower 30 includes the adhesive applicator comprising opposing spray nozzles 42. These communicate with a supply of an adhesive (not illustrated). The nozzles 42 emit a fine spray of adhesive to coat the opposing faces of the band 22. A return roller 44 at the top of the tower 30 directs the band 22 to an outlet 46 as directed by an outlet roller 48.

The outlet roller 48 communicates the metal band 22 to a coating applicator 50. The applicator 50 is an housing having an inlet end 52 and a collection basin 54 at a lower end. A guide roller 56 in an upper portion of the graphite applicator 50 directs the band 22 between a pair of opposing press rollers 58. The press rollers 58 are configured for receiving the crimped band 22 there between. A pair of exit drive rollers 60 direct the band 22 through an exit 62 from the graphite applicator 50. A conduit has an opening 62 for communicating intercalated graphite particles generally 64 from a supply (not illustrated) into the inlet end 52 of the graphite applicator 50.

A pair of pivotally mounted wire brushes 70 are disposed on opposing sides of the travel path for the elongate band 22 near the exit from the graphite applicator 50. The wire brushes 70 mount on pivotable bases 72 in order to move from a first position spaced-apart from the elongate band 22 to a second position with the wire brushes 70 in contact with the respective face of the metal band. The wire brushes 70 are rotatable such as by a pneumatic motor 74 which rotates the shaft on which the wire brushes 70 mount.

A treatment station 75 includes spray nozzles 76 which communicate with a supply of a treating solution. A tray 77 collects the overspray. The sprayer 76 in the treatment section 75 applies a spray coating to the jacket. In a preferred embodiment, the spray is an acid bath to provide increased temperature range for the gasket having the jacket of expanded intercalated graphite particles. The treatment solution is selected from the group of phosphoric acid, aluminum hydroxide, silicone carbonate, and boron.

An idler arm 80 connects by a pivot 82 to the frame for the apparatus 10. The arm 80 is biased by a spring. A roller 86 attaches to a laterally extending distal portion of the arm 80. The roller 86 guides the band 22 into a cutter assembly 90.

The cutter assembly 90 mounts to a movable frame 92. The frame 92 moves from a retracted position to an extended position as operated by a motor-driven screw assembly 93. The cutter 90 includes a pivotable knife 94. The knife 94 moves from a first position away from an opening in the cutter assembly 90 to a cutting position whereby the band 22 passing through the opening is severed. A table 96 reciprocally mounts to the cutter assembly 90. The table 96 moves between a first position adjacent the cutter assembly 90 and a second position spaced-apart from the cutter assembly. In the first position, the table 96 firmly bears against the band 22 in the cutter assembly 90 to hold the band secure during the cutting operation of the knife 94. The table 96 drops to the second position during the winding process for forming the spiral wound gasket of the present invention, as discussed below.

The gasket forming section 14 includes a rotatable die 100. The die 100 in the illustrated embodiment is an annular disc in which at least one slot 102 is formed. The slot extends inwardly from a perimeter edge 104 of the die 100. The perimeter edge 104 conforms in cross sectional shape to the surface defined by the crimp rollers 24 whereby the metal band 22 is matingly held to the perimeter edge 104 of the die 100. A tracking roller 106 mounts to a frame 108 that is spring biased to a support column 110. The support column includes a potentiometer 112 to measure the movement of the support frame 108 in the support column 110.

A welding apparatus 120 is disposed opposing the tracking roller 106. The welding apparatus 120 connects to a reciprocal member 122 in order to move the welding apparatus 120 from a first position spaced-apart from the die 100 to a second position in which a pair of electrodes 124 are in contact with portions of the elongate band 22 on the die 100.

The gasket discharge section 16 includes a tapping apparatus 130. The tapping apparatus 130 has a pneumatic cylinder 132 from which a piston extends and retracts. A tapper 134 attaches to the distal end of the piston of the cylinder 132. In the illustrated embodiment, the tapper 136 is a bronze disc. The cylinder 132 mounts to an arm 136 that encloses a screw rod 138. The screw rod 138 attaches to the end of the arm 136. The opposing end of the screw rod 138 defines a roller 140. A motor 142 connects to a driver roller 146. A belt 148 extends between the driver roller 146 and the roller 140.

Figure 2:
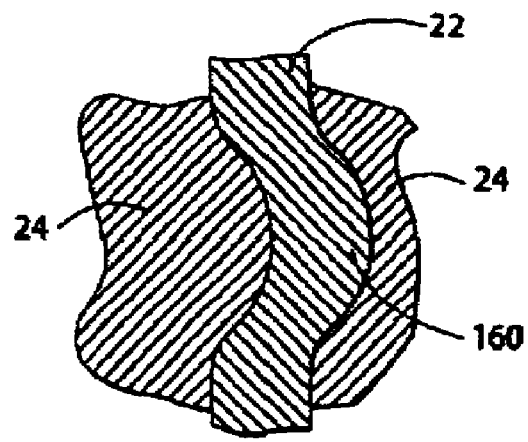
FIG. 2 is a cross-sectional view of opposing crimp rollers in the band supply section of the apparatus illustrated in FIG. 1, taken along line 2—2.

FIG. 2 is a cross-sectional view taken along line 2—2 of FIG. 1, showing the opposing crimp rollers 24 that receive the band 22 in a gap between the crimp rollers. The opposing faces of the crimp rollers 24 define a protruding crimp 160 in the band 22 as it moves longitudinally between the rollers.

Figure 3:
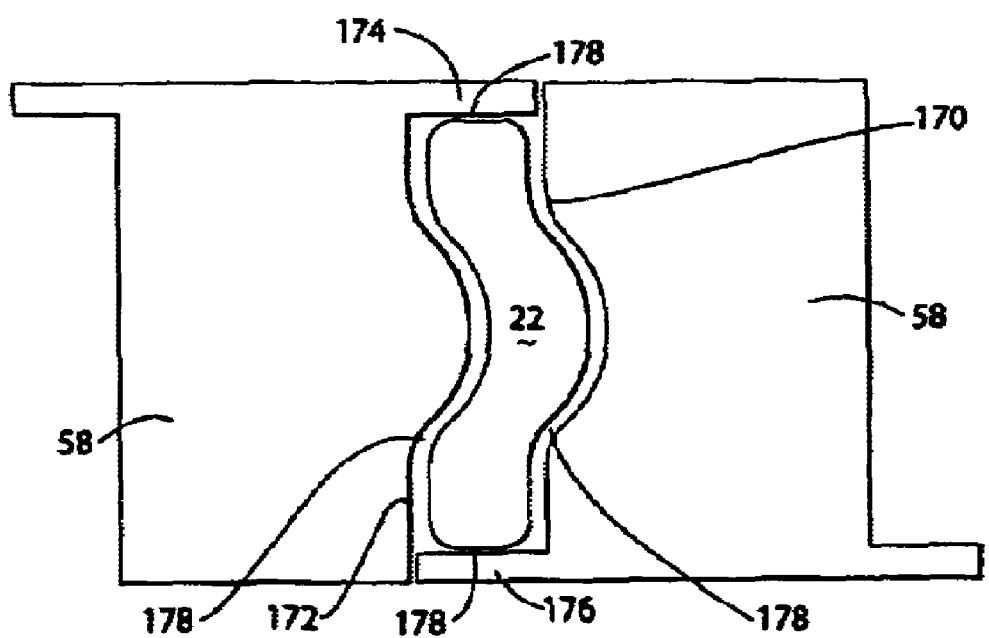
FIG. 3 is a cross-sectional top view of the opposing press rollers for applying a sealing material to the elongate band in the apparatus illustrated in FIG. 1, taken along line 3—3.

FIG. 3 is a cross-sectional top view taken along line 3—3 of FIG. 1, showing the opposing press rollers 58 in the graphite applicator 50. The press rollers 58 have opposing faces 170, 172 that conform to the crimp shape of the band 22 defined by the crimp rollers 24. The rollers 58 include opposing flanges 174, 176, whereby the elongate band 22 passing between the rollers 58 is substantially enclosed.

The rollers 58 however are spaced to define a gap 178 between the faces of the rollers and the elongate band 22.

Figure 4:
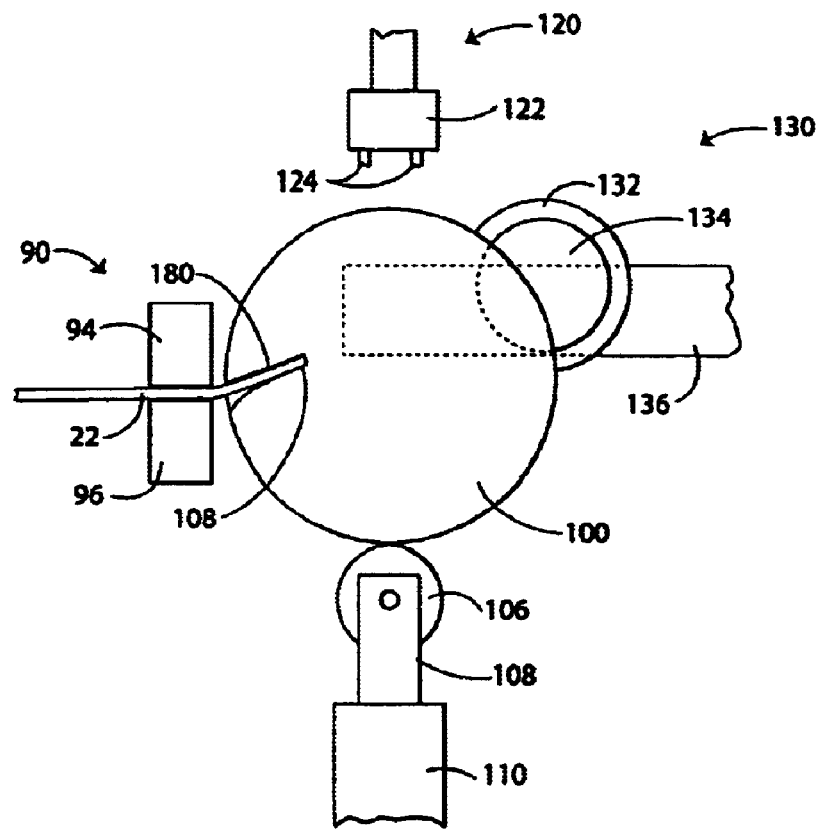
FIG. 4 is a side elevational view of a gasket forming section of the apparatus illustrated in FIG. 1.

FIG. 4 is a side elevational view of the gasket forming section 16 in which the cutter assembly 90 is disposed adjacent the die 100. The table 96 is raised relative to the knife 94 in order to hold the elongate band 22 in the cutter assembly 90. A distal end portion 180 of the band 22 is illustrated received in the slot 102.

Figure 5:
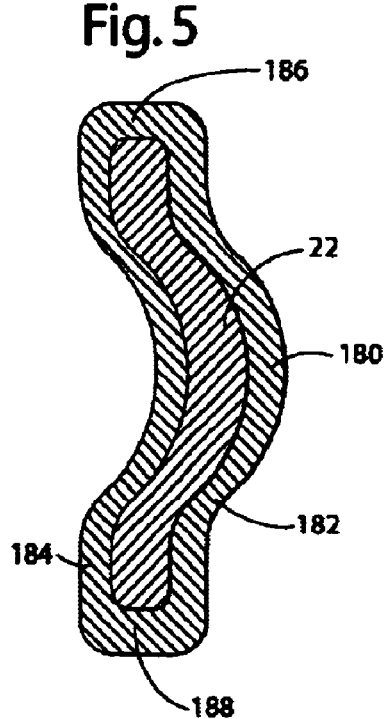
FIG. 5 is a cross-sectional view of a metal band jacketed with the sealing material by the apparatus illustrated in FIG. 1.

FIG. 5 is a cross-sectional view of the metal band 22 after exiting the graphite applicator 50. The elongate band is enclosed in a graphite jacket 180 with opposing high density regions generally 182, 184 on the side faces of the band 22 and opposing low density regions 186, 188 on the relatively thin sides of the band 22.

Figure 6:
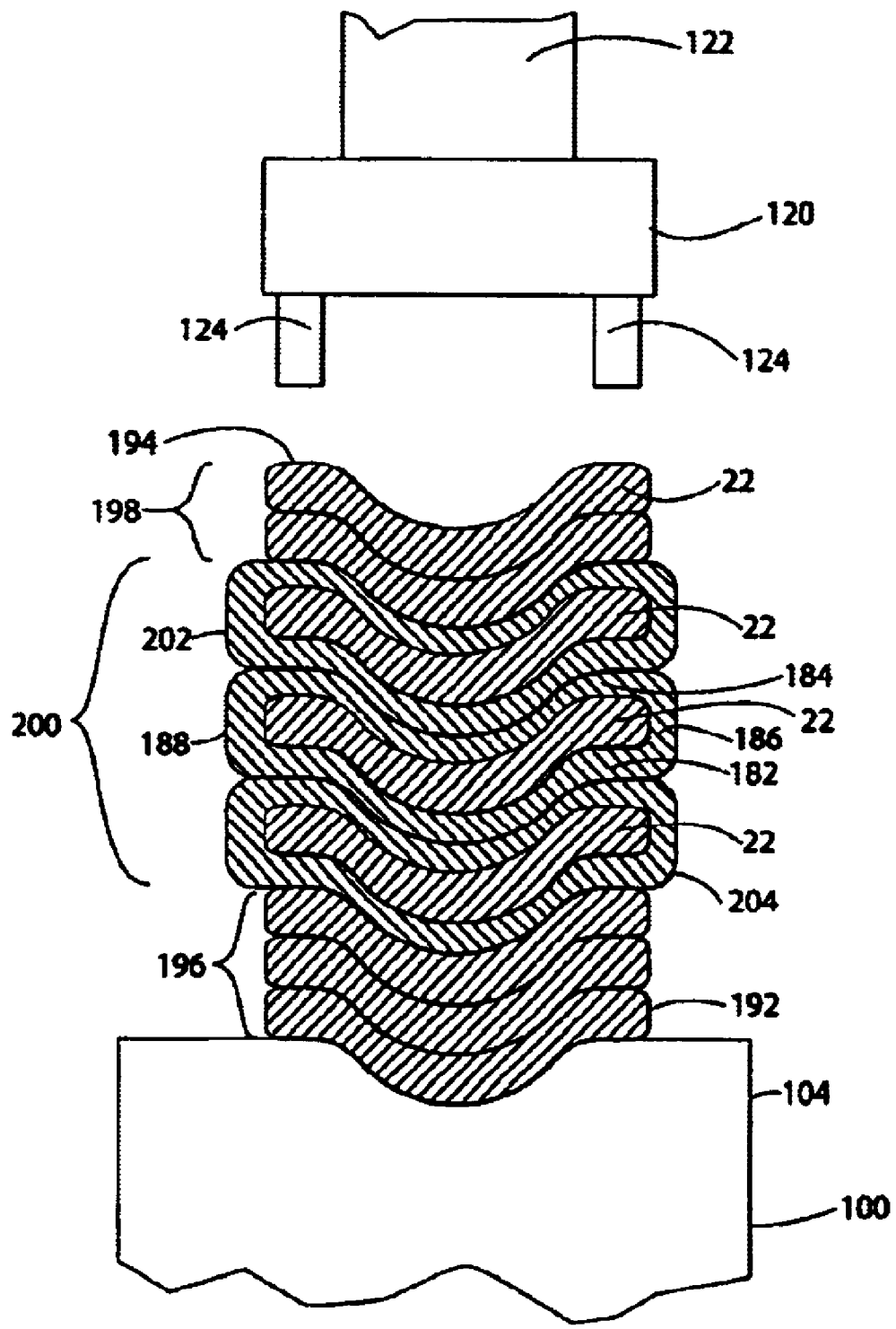
FIG. 6 is a cross-sectional view taken along line 6—6 of FIG. 1 illustrating the gasket formed on the die in the gasket forming section of the apparatus illustrated in FIG.

FIG. 6 is a partial view of the gasket forming section 14, with a cross-sectional view taken along line 6—6 showing details of the gasket formed on the die 100 in the forming section 14. The die 100 is illustrated with a plurality of turns of the coated elongate band 22 wound around the perimeter 104 to form the gasket according to the present invention. The welding apparatus 120 is illustrated spaced-apart from the radially thick cross-sectional view of the gasket, prior to moving into position for securing portions of the metal band 22 together.

With reference to FIG. 1, the apparatus 10 of the present invention is operated in order to form a spiral wound gasket. The roll of the narrow thin elongate metal band 22 is attached to a rotatable mandrel in the band supply section 12 to provide a supply of the elongate band for winding into the spiral wound gasket. The elongate band 22 feeds through the opposing crimp rollers 24. As best illustrated in FIG. 2, the crimp rollers form the crimp 160 longitudinally in the band 22. In the illustrated embodiment, the crimp comprises a U-shape projection 160. This provides a lateral corrugation for increased rigidity and resistance to reduce the tendency of the side wall to buckle under loading. Returning again to FIG. 1, the elongate band 22 feeds over the rollers 38, 40 and passes through a cleaner bath solution held in the basin 36. The cleaner solution removes the contaminants, such as oils and other materials left on the band 22 during manufacturing. The band 22 passes into the tower 30 for application of an adhesive. The nozzles 42 spray the opposing broad faces of the elongate band 22. The adhesive coated band 22 passes over the roller 44 and the roller 48 and exits from the tower 30 through the opening 46.

A sealing material is then applied to the elongate band 22. In the illustrated embodiment, the sealing material is expanded intercalated graphite particles 64 communicated through the conduit opening 62 into the inlet end 52 of the graphite applicator 50. The particles 64 are sprinkled over the elongate band 22 as it passes over the roller 56 and between the opposing press rollers 58.

With reference to FIG. 3, the expanded intercalated graphite particles 64 fall onto the opposing press rollers 58 and in between the rollers and the band 22. The expanded intercalated graphite particles 64 fill in the gaps 178. As the press rollers 58 rotate, the expanded intercalated graphite particles 64 are pressed together forming the graphite jacket 180 about the elongate metal band 22.

Returning to FIG. 1, the jacketed elongate band 22 exits the graphite applicator 50 driven by the exit driver rollers 60 and through the opening 62.

At the treatment station 75, the spray nozzle 76 communicate the treating solution to the jacketed elongated band 22. Overspray collects in the tray 77.

Periodically, the wire brushes 70 are pivoted from the spaced-apart position to the contact position whereby the wire brushes 70 are brought into contact with the elongate band 22. The motors 74 operate in order to rotate the wire brushes 70 which bear against the opposing broad faces of the elongate band 22. The wire brushes remove the graphite jacket 180 from the portion of the elongate band 22 on which the brushes are brought into contact. The purpose of removing the graphite from a portion of the elongate band 22 is to provide metal surfaces for welding and for being exposed on the inner diameter and outer diameter of the completed spiral wound gasket, as discussed below. The elongate band 22 passes under the idler roller 86 attached to the idler arm 80. The elongate band 22 is held in the cutter assembly 90. The table 96 reciprocates from the first position to the second position bearing the elongate band against the cutter assembly 90. In the spaced-apart position of the table 96 the elongate band 22 is spaced apart from the cutter assembly 90, as discussed below.

With reference to FIG. 4, the cutter assembly 90 moves between the retracted position whereby the cutter assembly 90 is spaced-apart from the die 100 and the extended position in which the cutter assembly 90 is brought close to the perimeter edge 104 of the die 100. In this position, the elongate band 22 is held between the table 96 and the cutter assembly 94. A distal portion 180 of the band 22 is fed into the slot 108 in the disc 100. The disc 100 is rotated in order to start winding the elongate band 22 about the perimeter 104 of the die 100. As the initial portion of the elongate band reaches the tracking roller 106, the table 96 is released and drops to the second spaced-apart position. The idler arm 80 moves downwardly as the table 96 moves downwardly. The table 96 moves out of the way, and the roller 92 guides the travel of the elongate band 22 as it moves longitudinally towards the die 100.

The elongate band 22 defines a tangent to the die 100, in order to avoid bending the elongate band 22 as it wraps around the perimeter 104 of the die. One and one half revolutions of the die 100 are made. The die 100 stops rotating. The welding apparatus 120 moves from its retracted position to the engagement position placing the welding tips 124 against the elongate band 22 opposing the tracker roller 106. The welding apparatus 120 is operated to secure the overlapping band 22 together. In the illustrated embodiment, the welding tips 124 are electrodes. An electric current communicated between the electrodes through the metal elongate band 22 spot welds the outer wrap to the inner wrap. The welding apparatus 120 then moves to its retracted position spaced apart from the die 100. The die 100 resumes rotating in order to wind a plurality of overlapping layers of the elongate band onto the die 100 and thereby form a radially increasing thickness of a gasket.

The tracker roller 106 is biased to the support column 110. The potentiometer 112 measures the change in the position of the tracker roller 106 relative to the support column 110. This provides a measure of the increasing radial thickness of the spiral wound gasket being formed on the die 100. At an appropriate time, depending on the outer diameter of the gasket being formed, the wire brushes 70 are pivoted from the retracted position to a position where the wire brushes bear against the wide faces of the elongate band 22. The wire brushes 70 are rotated by the motors 74 in order to brush away the graphite particles covering a portion of the elongate band 22. The length of the portion for which the jacket 180 is removed is a length sufficient to provide at least one and a half ending wraps of the elongate band around the gasket being formed, as well as to provide one and a half leading wraps of the elongate band 22 for the next gasket to be formed. It is to appreciated that this portion includes the short distal portion 180 received in the slot 108.

When the final one and a half wraps of the uncovered elongate band 22 are made, the rotation of the die 100 stops. The welding apparatus 120 moves from the retracted position to a contacting position with the welding tips 124 in contact with the exterior surface of the elongate band on the die 100. The welding apparatus 120 is actuated to spot weld the distal end of the gasket being formed on the die 100. The welding apparatus 120 then retracts.

The motor 142 is operated to drive the belt 148 so that the screw 138 rotates. This moves the arm 136 laterally towards an alignment position relative to the die 100. When the tapper 134 is aligned with an arcuate portion of the die 100 and the gasket wrapped around the perimeter edge 104, the motor 142 stops. The table 96 moves to its elevated position in order to hold the elongate band 22 firmly in the cutter assembly 90. The knife 94 is pivoted to sever the gasket on the die 100 from the supply of the elongate band 22.

The pneumatic cylinder 132 is actuated to drive the tapper 134 strikingly against the side face of the die 100. The tapper 134 bears forcingly against the die 100 and the gasket formed thereon, and this sharp hit taps the gasket free of the die 100.

The pneumatic cylinder 132 retracts the tapper 134. The motor 142 is reversed to move the arm 136 from its extended position to the retracted position spaced apart from the die 100.

FIG. 6 illustrates a cross-sectional view of the gasket 190 made with the apparatus 10. The gasket 190 defines an inner face 192 on the inner diameter of the gasket 190 and an outer face 194 on the outer diameter of the gasket. An inner portion 196 has a wrap and a half of the unjacketed band 22. Similarly, an outer diameter portion 198 has a wrap and a half of the unjacketed band 22. The wraps for the inner portion 196 and the wraps for the outer portion 198 are each secured by welds to hold the gasket together. An intermediate section 200 includes a plurality of turns of the jacketed elongate band 22. As the band 22 is wound around the perimeter of the die 100, the expanded intercalated graphite worms in the opposing high density regions generally 122, 184 become more densely packed. The low density regions 186, 188, however, do not become more densely packed as the winding continues to form the gasket. Accordingly, the resulting gasket has opposing faces 202, 204 of a low-density sealing material which contact the faces of the flange in the connection being sealed. The low density provides a relatively low minimum seat to affect the seal. The high density sealing material 182, 184, in combination with the crimp 160, allow the gasket to resist interbuckling.

The present invention accordingly provides an apparatus and method for forming improved spiral wound gaskets. The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departure from the spirit of the invention as described by the following claims.

What is claimed is:

1. A spiral wound gasket formed by jacketing an elongate band with a build up of a plurality of discrete expanded intercalated graphite worms, and wrapping the jacketed elongate band in a plurality of overlapping turns to define a radially thick gasket having an inner diameter for being exposed to a material to be sealed and an outer diameter, which wrapping compresses a portion of the jacket of the expanded intercalated graphite worms between adjacent overlapping turns of the elongate band to a first density to define interior portions of the gasket while a remaining portion of the jacket of expanded intercalated graphite worms defines opposing flange sealing faces of the gasket having a second density lower than said first density.

2. The spiral wound gasket as recited in claim 1, wherein the elongate band defines a protruding crimp extending along a longitudinal axis thereof.

3. The spiral wound gasket as recited in claim 2, wherein the crimp defines a U-shape in cross-section.

4. The spiral wound gasket as recited in claim 1, wherein the elongate band is metallic.

5. The spiral wound gasket as recited in claim 1, wherein the elongate band defines a radially inward portion and a radially outward portion, each radially inward portion and radially outward portion having overlapping segments of adjacent turns of the elongate band which overlapping segments are free of jacketing, and further comprising a connection between the overlapping segments in each respective radially inward portion and radially outward portion.

6. A spiral wound gasket prepared by a process comprising the steps of:
   jacketing an elongate band with a build up of a plurality of discrete expanded intercalated graphite worms;
   wrapping the jacketed elongate band in a plurality of overlapping turns to define a radially thick gasket having an inner diameter for being exposed to a material to be sealed and an outer diameter, the step of wrapping compresses a portion of the jacket of the expanded intercalated graphite worms between adjacent overlapping turns of the elongate band to a first density to define interior portions of the gasket while a remaining portion of the jacket defines opposing flange scaling faces of the gasket having a second density lower than the first density; and
   connecting in a radially inward portion and a radially outward portion overlapped turns of the elongate band free of the jacket to secure the gasket together.

7. The spiral wound gasket as recited in claim 6, wherein the elongate band defines a protruding crimp extending along a longitudinal axis thereof.

8. The spiral wound gasket as recited in claim 7, wherein the crimp defines a U-shape in cross-section.

9. The spiral wound gasket as recited in claim 6, wherein the elongate band is metallic.

* * * * *